United States Patent [19]

Toko

[11] Patent Number: 5,121,504

[45] Date of Patent: Jun. 9, 1992

[54] MOBILE RADIO TELEPHONE DEVICE WITH A DETACHABLE ADAPTER FOR EXTERNAL POWER AND ANTENNA CONNECTION

[75] Inventor: Yoshio Toko, Hyogo, Japan

[73] Assignee: Mitsubishi Denki Kabushiki Kaisha, Tokyo, Japan

[21] Appl. No.: 448,997

[22] Filed: Dec. 12, 1989

[30] Foreign Application Priority Data

Mar. 31, 1989 [JP] Japan ................. 64-82869

[51] Int. Cl.⁵ .................... H04B 1/38; H05K 11/02
[52] U.S. Cl. ........................... 455/90; 455/346; 455/349; 343/702; 343/711
[58] Field of Search ............... 455/89, 90, 78, 277, 455/345, 346, 351, 349; 343/762, 711, 712, 713

[56] References Cited

U.S. PATENT DOCUMENTS

| | | | |
|---|---|---|---|
| 3,665,310 | 5/1972 | Tweed, Jr. | 455/78 |
| 4,061,971 | 12/1977 | Banons | 455/346 |
| 4,085,366 | 4/1978 | Padgett | 455/78 |
| 4,255,730 | 3/1981 | Sekine et al. | 455/81 |
| 4,661,992 | 4/1987 | Garay et al. | 455/90 |
| 4,673,861 | 6/1987 | Dubovsky et al. | 455/346 |
| 4,914,714 | 4/1990 | Tamura | 455/277 |

Primary Examiner—Reinhard J. Eisenzopf
Assistant Examiner—Lisa Charouel
Attorney, Agent, or Firm—Rothwell, Figg, Ernst & Kurz

[57] ABSTRACT

This invention discloses a mobile radio telephone device in which when used as a remote handset, the circuitry of the radio telephone device is connected by an adapter to a portable antenna through an antenna input terminal and an antenna output terminal. When the mobile radio telephone device is being fixed to a vehicle, the circuitry of the radio telephone device is connected by an adapter to an external antenna through the antenna output terminal.

14 Claims, 5 Drawing Sheets

MOBILE RADIO TELEPHONE DEVICE WITH A DETACHABLE ADAPTER FOR EXTERNAL POWER AND ANTENNA CONNECTION

BACKGROUND OF THE INVENTION

1. Field of the Invention

This invention relates to a mobile radio telephone device which can be used in switching a portable antenna and an external antenna.

2. Prior Art

FIG. 1 is a block diagram showing the construction of a conventional mobile radio telephone device. In FIG. 1, reference numeral 1 designates a radio telephone device body, 11 is a circuit of a radio telephone device for execution of predetermined operations such as modulation, demodulation and amplification, and 12 is a detachable portable antenna mounted on the body 1. Reference numeral 13 designates power input terminals to which power is supplied when a power source portion 2 is mounted on the body, and 16 is an antenna input terminal. Numeral 3 is a separate antenna to be mounted on the body 1 in plate of the portable antenna 12 and 4 is a separate battery. Numeral 21 designates a battery mounted on power source 2.

FIG. 2 is a block diagram showing a further embodiment of a conventional mobile radio telephone device. In FIG. 2, numeral 17 designates an antenna change-over switch which detects the mounting of the antenna 3 to an antenna input terminal 18 to effect switching. In this embodiment, the portable antenna 12 is designed so that it may not be removed from the radio telephone device body 1.

The operation of the prior art device will be described hereinafter. The mobile radio telephone device shown in FIG. 1 is used with the portable antenna 12 and the power source portion 2 mounted on the radio telephone device body 1. In this case, radio waves received by the portable antenna 12 are inputted into the circuit 11 through the antenna input terminal 12, and signals outputted from the circuit 11 are delivered as radio waves for transmission from the portable antenna 12. Power from the battery 21 is supplied to the circuit 11 through the power source input terminal 13. When the device is used inside a vehicle, the transmission/receiving electric field signal level is lowered, and the antenna 3 is mounted on the antenna input terminal to strengthen the signal level.

The mobile radio telephone device shown in FIG. 2 utilizes the power source portion 2 when in use as a remote handset. When the device is used while being fixed to a vehicle, the portable antenna 12 remains mounted, and the antenna 3 fixed to the vehicle is connected to the antenna input terminal 18. The antenna change-over switch 17 is then switched to the antenna 3 fixed to the vehicle.

When the device is used while being fixed to the vehicle, the power source portion 2 can be removed, and as shown in FIGS. 1 and 2, it may be connected to the vehicle battery 4 to prevent consumption of power in the battery 21.

As discussed above, when the conventional mobile radio telephone device is used in a vehicle, a separate antenna is required to be mounted on the device, or a complicated change-over switch must be provided within the radio telephone device body. This construction has several disadvantages such as cumbersome handling and increased production costs.

SUMMARY OF THE INVENTION

This invention overcomes the problems as described above by providing mobile radio telephone device capable of being connected to an external antenna without having to separately mount the antenna when the device is used within the vehicle, and without requiring the complicated antenna change-over switch. It is a further object to provide a device which can be miniaturized and can be applied to various uses by changing its adapter.

The mobile radio telephone device according to this invention has a radio telephone device body comprising a power source input terminal, a portable antenna, an antenna input terminal connected to the antenna capable of contacting an adapter, an antenna output terminal connected to a radio device circuitry means and capable of contacting an adapter. Antenna connection means is provided in the adapter which can be detached from the radio telephone device body, and which, when mounted on the radio telephone device body, connects the antenna input terminal or an external antenna to the antenna output terminal. Power supply means is provided in the adapter for supplying power to the power source input terminal.

Other objects and features of the present invention will become apparent from the ensuing detailed description of embodiments described in connection with the accompanying drawings.

PREFERRED EMBODIMENTS OF THE INVENTION

Figure 1:
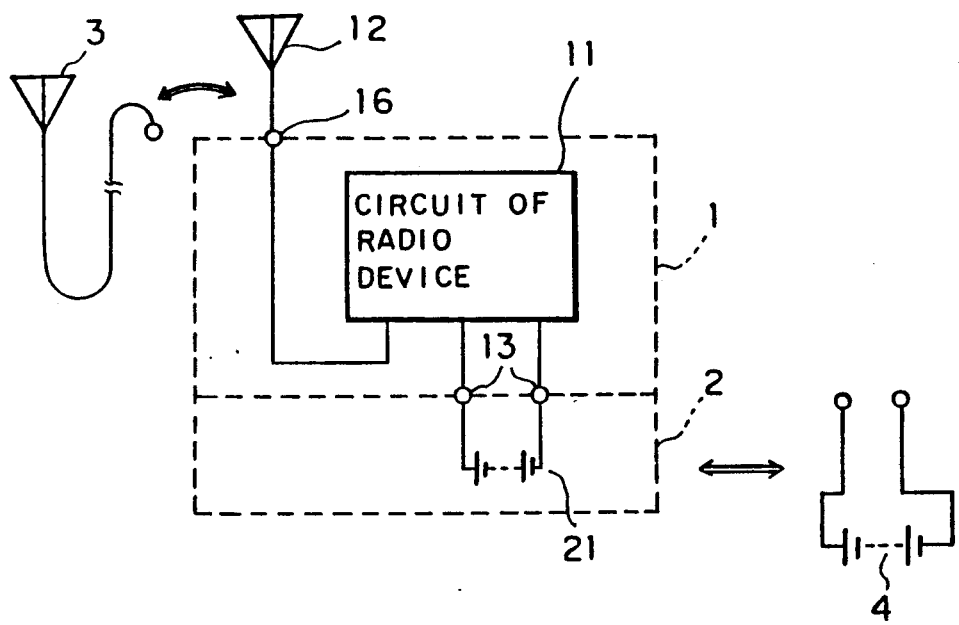
FIGS. 1 and 2 are respectively block diagrams showing a conventional mobile radio telephone device.
Figure 2:
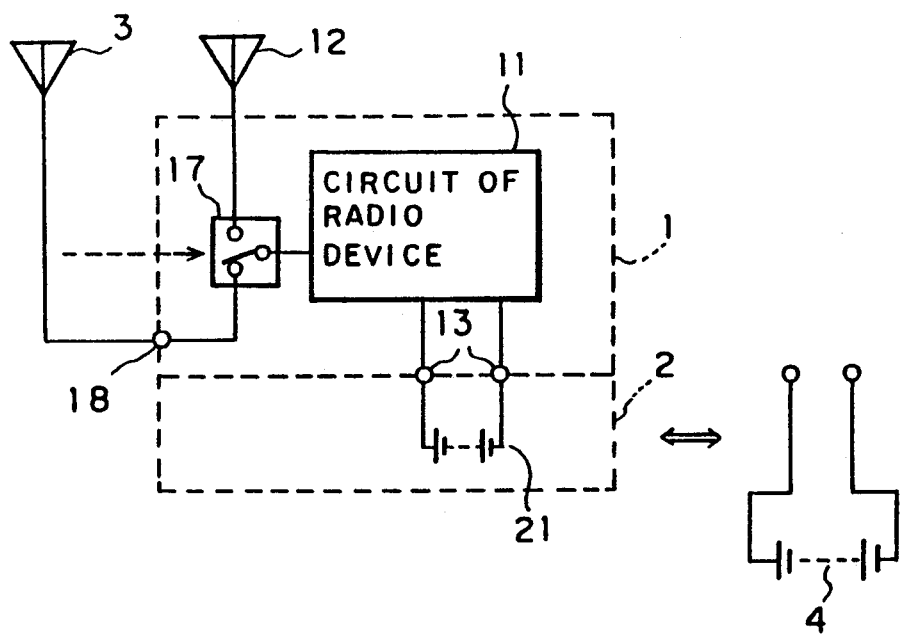
Figure 3:
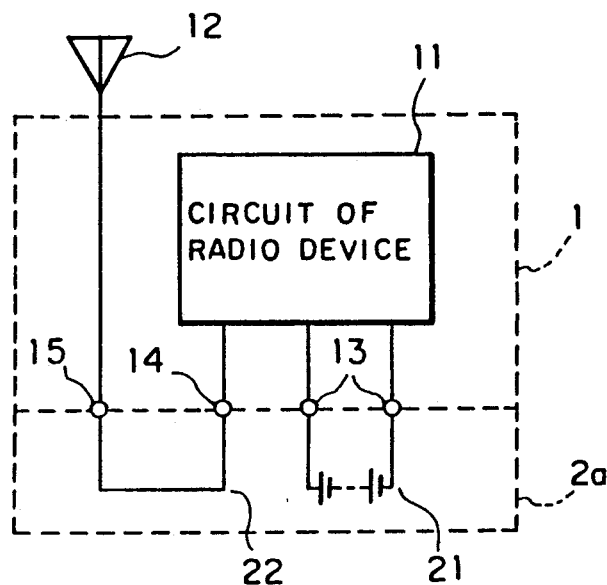
FIG. 3 is a block diagram showing a mobile radio telephone device when used as a remote handset according to one embodiment of this invention.

A preferred embodiment of this invention will be described hereinafter with reference to FIG. 3, which illustrates the mobile radio telephone device construction when operable as a remote handset telephone. In FIG. 3, reference numeral 14 designates an antenna output terminal capable of contacting an adapter 2a and connected to a radio device circuit 11. Circuit 11 is a radio device circuitry means which executes the known functions enabling the device to operate as a telephone such as modulation, demodulation and amplification of signals. Antenna input terminal 15 contacts the adapter 2a and is connected to a portable antenna 12. Adapter 2a has a battery 21 and connecting means 22 for connecting the antenna output terminal 14 and the antenna input terminal 15. Other components are the same as those shown in FIG. 1 and are indicated by the same reference numerals.

Figure 4:
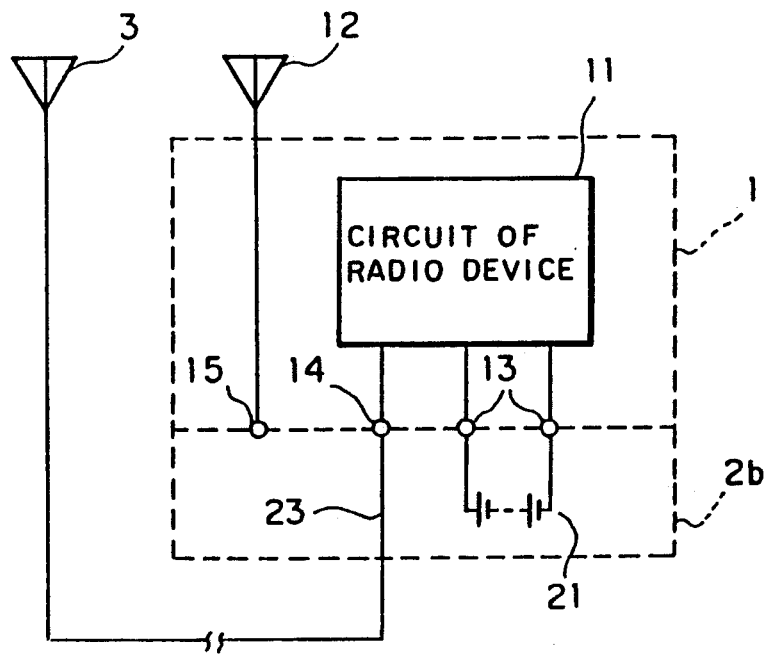
FIGS. 4-6 are respectively block diagrams showing mobile radio telephone devices when used while being fixed to the vehicle.
Figure 5:
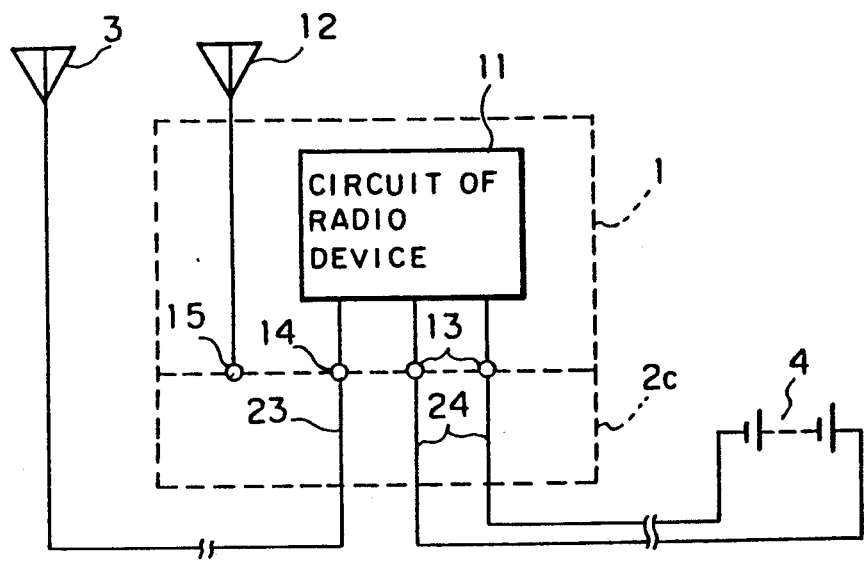
Figure 6:
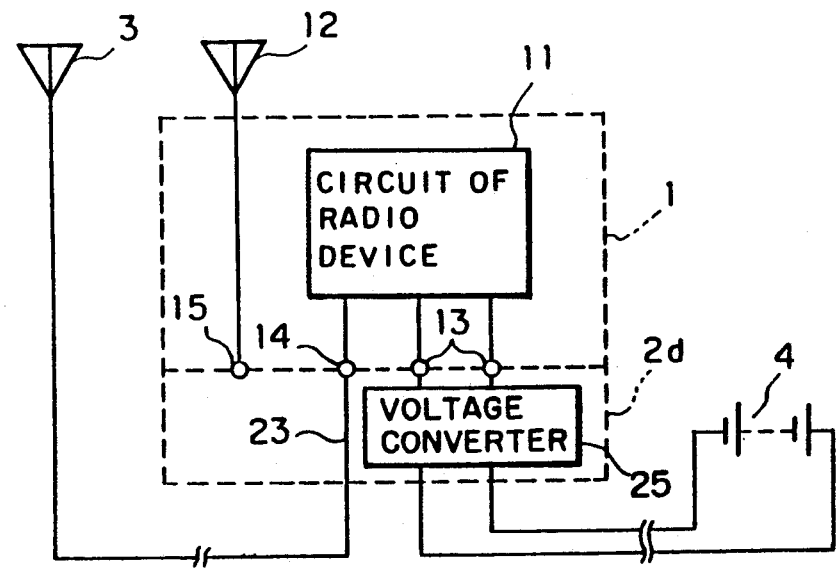

FIGS. 4-6 illustrate the mobile radio telephone device construction when operable inside a vehicle, and utilizing the vehicle's antenna. In FIG. 4, numeral 2b designates an adapter comprising a battery 21, and a connection cable 23 for connecting an external antenna 3 to the antenna output terminal 14. In FIG. 5, numeral 2c designates an adapter comprising power source cables 24 for connecting the vehicle battery 4 to power source input terminals 13. Connection cable 23 connects the external antenna 3 to the antenna output terminal 14. In FIG. 6, numeral 2d designates an adapter comprising a voltage converter 25 for converting a voltage of the vehicle battery 4 into a voltage suited to the radio telephone device circuitry means, and a connection cable 23 for connecting the external antenna 3 to the antenna output terminal 14.

In the above description, the antenna connection means is realized by the connecting means 22 or connection cable 23, and the power supply means is realized by the power source cables 24 or the voltage converter 25.

Next, the operation of the present invention will be described. When the device is used as a remote handset telephone, the adapter 2a shown in FIG. 3 is attached to the radio telephone device body. An output terminal of the battery 21 of the adapter 2a, or an output terminal of a lead wire, is joined to the power source input terminal 13 of the radio telephone device body 1. Accordingly, the radio telephone device circuitry means is supplied with power from the battery 21. The connecting means 22 of the adapter 2a is formed with means for carrying a high frequency signal, such as a coaxial cable, both ends of which are joined to the antenna output terminal 14 and antenna input terminal 15 when the adapter 2a is mounted. Accordingly, the circuit 11 of the radio telephone device and the portable antenna 12 operate in a high frequency mode. From the foregoing, radio signal reception and transmission become possible immediately after the adapter 2a is attached to the radio telephone device body 1. It is to be noted that if the length of the connecting means 22 can be made sufficiently short as compared with the wave length of radio wave used, a single wire instead of the coaxial cable can be used. A micro stripline formed on a substrate may also be employed.

When the device is used while being fixed to the vehicle, the adapter 2b shown in FIG. 4 is attached to the radio telephone device body 1. A terminal of the connection cable 23 in the adapter 2b is joined to the antenna output terminal 14 of the radio telephone device body 1. As a result, external antenna 3 is connected to the radio telephone device circuitry means. An output terminal of the battery 21 or an output terminal of a lead wire of the battery 21 is joined to the power source input terminal 13 of the radio telephone device body 1 when the adapter 2b is attached. Accordingly, the radio telephone device circuitry means is supplied with power from the battery 21 and is connected to the external antenna 3. Therefore, enhanced radio signal reception and transmission within the vehicle become possible immediately after attachment of the adapter 2b. Also in this case, a coaxial cable, a single wire or a micro stripline may be used as the connection cable 23.

According to a further embodiment, an adapter 2c is attached to radio telephone device body 1, as shown in FIG. 5, which enables the radio telephone device circuitry means to be powered by vehicle battery 4. The power source cables 24 for connecting a terminal of the vehicle battery 4 to the power source input terminal 13 is provided on the adapter 2c. In the case where the voltage of the battery 21 is different from that of the vehicle battery 4, adapter 2d is provided which utilizes voltage converter 25 for converting voltage of the vehicle battery 4 to a voltage suitable for radio telephone device circuitry means, as shown in FIG. 6. The output terminal of the voltage converter 25 is joined to the power source input terminal 13 when the adapter 2d is attached. In these cases, consumption of the battery 21 can be prevented.

While the adapters 2b-2d have been illustrated as separate embodiments, it is possible that one kind of adapter including any number of the various aforementioned functions may be employed. For example, a detachable adapter means could comprise means for connecting the external antenna to the antenna output terminal when connected to the radio telephone device body and also comprise means for connecting the antenna input terminal to the antenna output terminal when connected to the radio telephone device body.

Figure 7A:
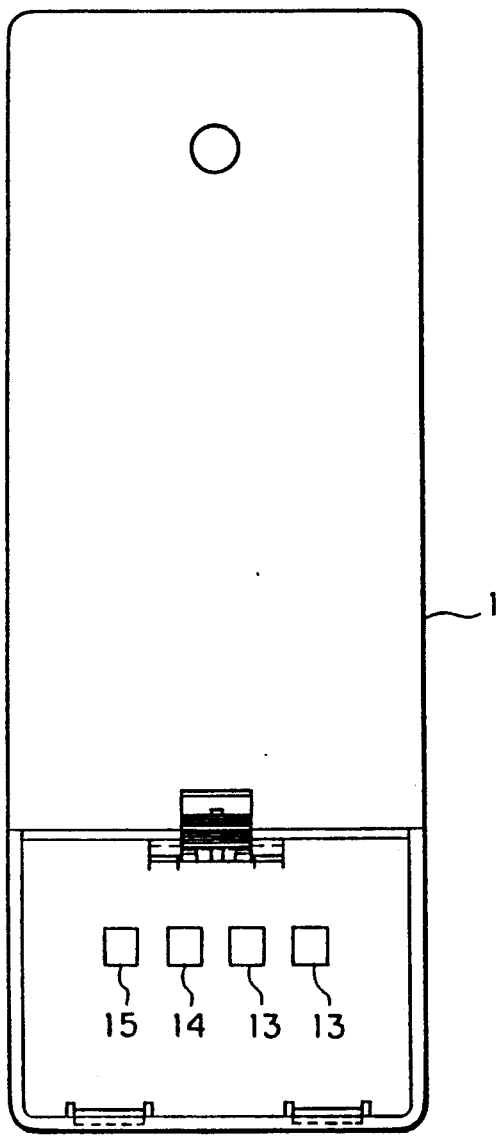
FIGS. 7A-7D are perspective and part cross sectional views showing an external appearance of the mobile radio telephone device.
Figure 7B:
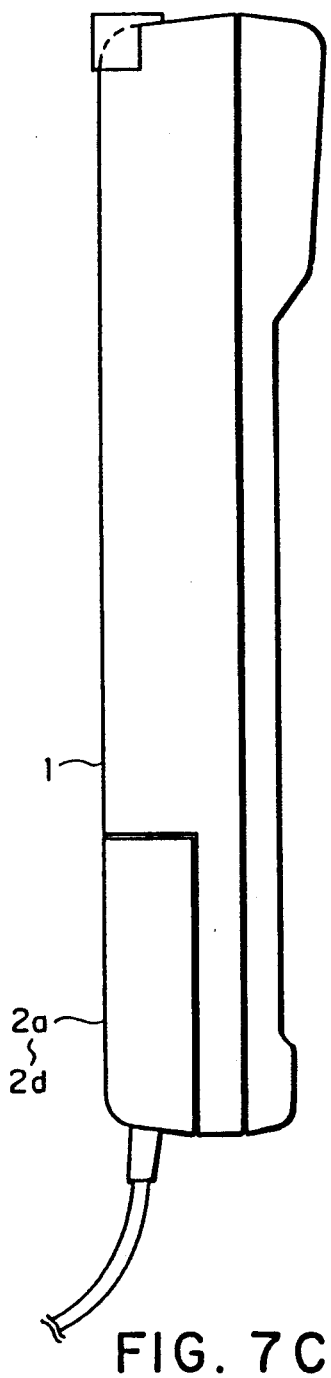
Figure 7D:
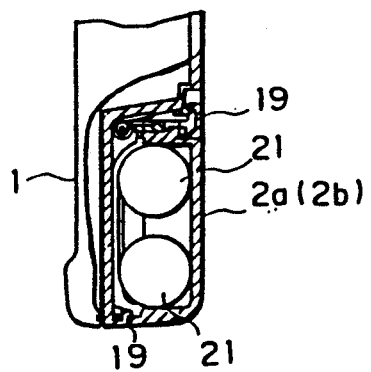
Figure 7C:
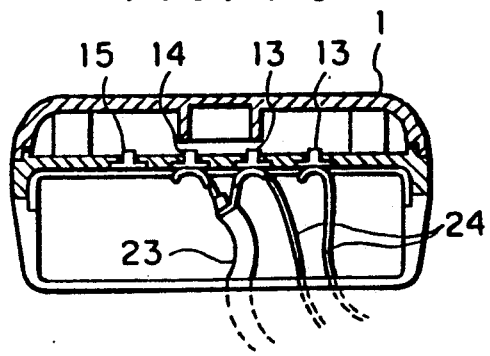

FIGS. 7A-7D are external views of a mobile radio telephone device body 1 in the above-described embodiments. FIG. 7A is a front view of the radio telephone device body 1 when the adapters 2a to 2d are not attached. As shown, terminals 13 to 15 are provided. FIG. 7B is a side view of the mobile radio telephone device in the state wherein the adapters 2a to 2d are attached. FIG. 7C is a bottom view of mobile radio device body 1 when the adapters 2a to 2d are not attached, showing for illustration purposes, a connection cable 23 in the form of a coaxial cable within the adapter 2c and power source cables 24. FIG. 7D shows a general locking mechanism 19 for attaching the adapters 2a and 2b, with the batteries 21, to radio telephone device body 1. Locking mechanism 19 is also provided to for attaching adapters 2c and 2d to the radio telephone device body as well.

Figure 8:
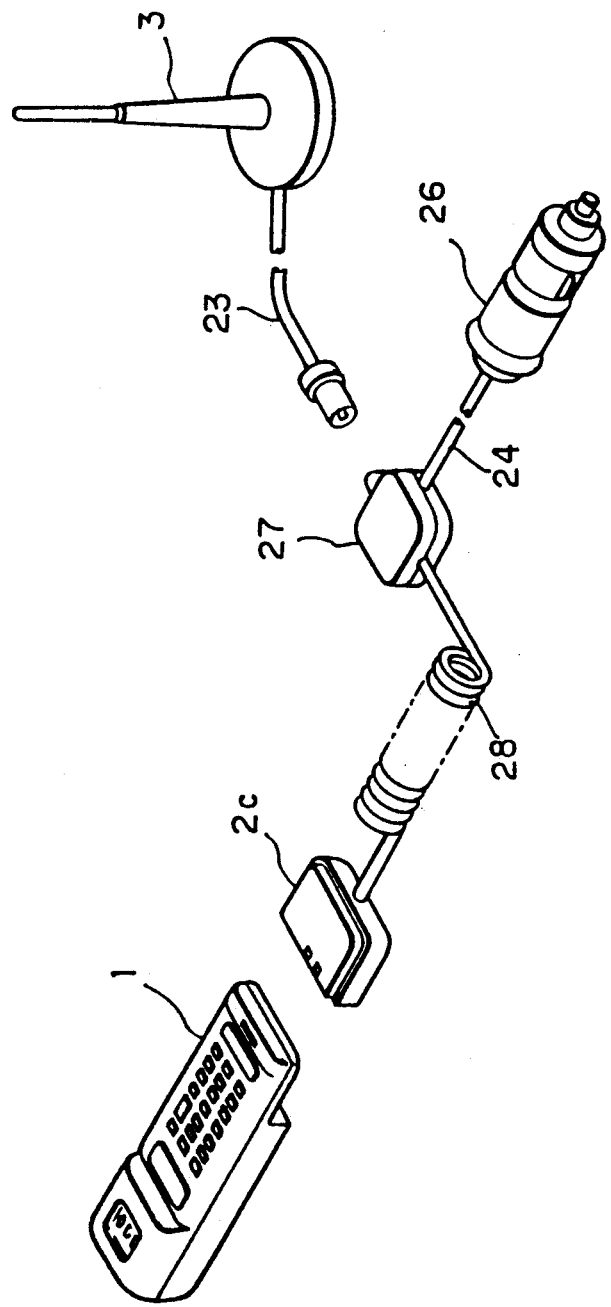
FIG. 8 illustrates the mobile radio telephone device as shown in FIG. 5.

FIG. 8 shows the embodiment in which the adapter 2c is connected to the external antenna 3 and a vehicle battery (not shown). Adapter 2c is connected to cable distributor 27 by cable 28 which includes connection cable 23 and power source cables 24. Cable distributor 27 connects the external antenna 3 to the adapter 2c through cable 23, and the cigarette lighter adapter 26 through cable 24. Inserting cigarette lighter adapter into the vehicle cigarette lighter supplies power from the vehicle battery to the radio telephone device circuitry means.

As described above, according to the present invention, a mobile radio telephone device is designed so that when the illustrated detachable adapter is attached to the device body, a portable antenna or an external antenna is connected to radio telephone device circuitry means and power is supplied to the circuitry means. Therefore, an antenna switching mechanism or an antenna replacing mechanism need not be provided on the device body. Reception and transmission of radio signals become possible merely by attachment of the adapter. The present invention as described above is directed toward a versatile mobile radio telephone device which has a structure less complicated than the prior art devices and is less in cost. Connecting an external antenna and power source through the adapter alleviates the need for mounting a cumbersome separate antenna or using complicated change-over switch.

What is claimed is:

1. A mobile radio telephone device comprising:
a radio telephone device body;
said radio telephone device body comprising a portable antenna for transmitting and receiving a radio signal, a radio telephone device circuitry means, a power source input terminal connected to the radio telephone device circuitry means, an antenna output terminal connected to said radio telephone device circuitry means and an antenna input terminal connected to the portable antenna:

an adapter means which is detachable from said radio telephone device body;

said adapter means comprising a first antenna connection means for connecting an external antenna to said antenna output terminal when attached to said radio telephone device body and a second antenna connection means for connecting said antenna input terminal to said antenna output terminal when connected to said radio telephone device body; and said adapter means further comprising power supply connection means for supplying power to said power source input terminal.

2. The mobile radio telephone device according to claim 1 wherein said adapter means comprises at least a first adapter comprising said first antenna connection means and a second adapter comprising said second antenna connection means.

3. The mobile radio telephone device according to claim 1, wherein said first antenna connection means comprises a first connection means, one end of which is joined to said antenna output terminal and the other end of which is joined to said external antenna.

4. The mobile radio telephone device according to claim 5, wherein the first connection means comprises a coaxial cable.

5. The mobile radio telephone device according to claim 3, wherein the first connection means comprises a single wire.

6. The mobile radio telephone device according to claim 3, wherein the first connection means comprises a micro stripline.

7. The mobile radio telephone device according to claim 1, wherein said power supply connection means comprises a battery in which an output terminal thereof or an output terminal of a lead wire thereof is joined to said power supply input terminal when said first or second antenna connection means is attached to said radio telephone device body.

8. The mobile radio telephone device according to claim 2, wherein said power supply connection means in said first adapter comprises a power source cable, one end of which is joined to said power source input terminal, the other end connected to a vehicle battery.

9. The mobile radio telephone device according to claim 2, wherein said power supply connection means in said first adapter comprises a voltage converter, an output terminal of which is joined to said power source input terminal and an input terminal of which is connected to a vehicle battery, said voltage converter comprising means for converting the voltage of a vehicle battery to a voltage suitable for said radio telephone device circuitry means.

10. The mobile radio telephone device according to claim 2, wherein said second antenna connection means comprises second connection means for connecting said antenna output terminal to said antenna input terminal when said second adapter is attached to said radio telephone device body.

11. The mobile radio telephone device according to claim 10, wherein said second connection means comprises a coaxial cable.

12. The mobile radio telephone device according to claim 10, wherein said second connection means comprises a single wire.

13. The mobile radio telephone device according to claim 10, wherein said second connection means comprises a micro stripline.

14. A mobile radio telephone device, comprising:
a radio telephone device body, including a portable antenna for transmitting and receiving radio waves, a radio telephone device circuit, a power source input terminal connected to the radio telephone device circuit, an antenna output terminal connected to the radio telephone device circuit, and an antenna input terminal connected to said portable antenna; and
an adapter detachably connectable to said radio telephone device body, including connection means for connecting said antenna input terminal to said antenna output terminal, and power supply means connectable to said power source input terminal for supplying power to said radio telephone device circuit.

* * * * *

UNITED STATES PATENT AND TRADEMARK OFFICE
CERTIFICATE OF CORRECTION

PATENT NO. : 5,121,504

DATED : June 9, 1992

INVENTOR(S) : Yoshio Toko

It is certified that error appears in the above-identified patent and that said Letters Patent is hereby corrected as shown below:

Column 1, line 24, "plate" should be --place--.

Signed and Sealed this

Fifth Day of October, 1993

Attest:

BRUCE LEHMAN

*Attesting Officer*     *Commissioner of Patents and Trademarks*